United States Patent
Ninan et al.

(10) Patent No.: US 10,270,108 B2
(45) Date of Patent: Apr. 23, 2019

(54) COOLANT STORAGE TANK (71) Applicant: Intelligent Energy Limited, Loughborough (GB)

(72) Inventors: Daniel Ninan, Loughborough (GB); Nathaniel Palmer, Loughborough (GB); Sophie Charlotte Harris, Loughborough (GB); Phillip Wardle, Loughborough (GB); Jonathan Cole, Loughborough (GB); Iain Fraser, Loughborough (GB); Peter David Hood, Loughborough (GB); Paul Leonard Adcock, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 59 days.

(21) Appl. No.: 15/313,318

(22) PCT Filed: May 7, 2015

(86) PCT No.: PCT/GB2015/051341
§ 371 (c)(1),
(2) Date: Nov. 22, 2016

(87) PCT Pub. No.: WO2015/177507
PCT Pub. Date: Nov. 26, 2015

(65) Prior Publication Data
US 2017/0214065 A1    Jul. 27, 2017

(30) Foreign Application Priority Data
May 23, 2014 (GB) .................................. 1409279.5

(51) Int. Cl.
*H01M 8/04* (2016.01)
*H01M 8/04007* (2016.01)
(Continued)

(52) U.S. Cl.
CPC ... *H01M 8/04074* (2013.01); *H01M 8/04029* (2013.01); *H01M 8/04253* (2013.01); *H01M 8/04358* (2013.01); *H01M 8/04723* (2013.01)

(58) Field of Classification Search
CPC ......... H01M 8/04074; H01M 8/04029; H01M 8/04253; H01M 8/04358; H01M 8/04723
(Continued)

(56) References Cited

U.S. PATENT DOCUMENTS 8,877,397 B2 *  11/2014  Rainville ................ H01M 8/04
                                                    429/427
2003/0039872 A1   2/2003  Grasso
(Continued)

FOREIGN PATENT DOCUMENTS

CN    102447123 A    5/2012
JP    2004186028 A    7/2004
(Continued)

OTHER PUBLICATIONS

Machine translation of JP 2005-302361.*
(Continued)

*Primary Examiner* — Renee S Luebke
*Assistant Examiner* — Paul D Baillargeon
(74) *Attorney, Agent, or Firm* — BakerHostetler (57) ABSTRACT

A coolant storage tank (1) for storing coolant in a fuel cell system (2), the coolant storage tank comprising a plurality of individually controllable heater elements (7, 8a, 8b). A coolant storage tank comprising a first heater element (7) located at a base of the coolant storage tank and a second heater element (8a) is also disclosed. A coolant storage tank comprising a first coolant storage compartment (50) in fluid communication with a second coolant storage compartment (51), the first coolant storage compartment including at least a first heater element (54) and wherein the second coolant (Continued)

storage compartment is unheated is also disclosed. A method of melting frozen coolant in a coolant storage tank is also disclosed.

17 Claims, 5 Drawing Sheets

(51) Int. Cl.
*H01M 8/04029* (2016.01)
*H01M 8/04223* (2016.01)
*H01M 8/0432* (2016.01)
*H01M 8/04701* (2016.01)

(58) Field of Classification Search
USPC .......................................................... 429/437
See application file for complete search history.

(56) References Cited

U.S. PATENT DOCUMENTS

| | | |
|---|---|---|
| 2004/0001982 A1 | 1/2004 | Reiser |
| 2007/0119638 A1 | 5/2007 | Grieve |
| 2009/0183778 A1* | 7/2009 | Wildegger .............. B60S 1/487 137/13 |
| 2011/0081590 A1 | 4/2011 | Artmann |

FOREIGN PATENT DOCUMENTS

| | | |
|---|---|---|
| JP | 2005302361 A | 10/2005 |
| JP | 2007280888 A | 10/2007 |
| KR | 100643472 B1 | 10/2006 |
| KR | 20130013644 A | 2/2013 |
| WO | 2005038973 A1 | 4/2005 |
| WO | 2008057085 A1 | 5/2008 |
| WO | 2008082399 A1 | 7/2008 |
| WO | 2009156132 A1 | 12/2009 |
| WO | 2013142115 A1 | 9/2013 |

OTHER PUBLICATIONS

Search Reports under Section 17(5) in Appln. GB1409279.5, dated Nov. 20, 2014 and Jan. 19, 2015, 10 pages.
Written Opinion of the International Searching Authority in PCT/GB2015/051341, dated Nov. 10, 2015, 11 pages.
International Preliminary report on Patentability in PCT/GB2015/051341, dated Nov. 29, 2016, 12 pages.
International Search Report in PCT/GB2015/051341, dated Nov. 10, 2015, 4 pages.

* cited by examiner

COOLANT STORAGE TANK

CROSS REFERENCE TO RELATED APPLICATIONS

This is a National Phase entry of International Application No. PCT/GB2015/051341, filed May 7, 2015, which claims priority to Great Britain Application No. 1409279.5, filed May 23, 2014, the disclosures of which are incorporated herein by reference in their entireties.

BACKGROUND OF THE INVENTION

This invention relates to a coolant storage tank for a fuel cell system. In particular, it relates to a fuel cell water storage tank. The invention also relates to a fuel cell system including said coolant storage tank.

Conventional electrochemical fuel cells convert fuel and oxidant into electrical energy and a reaction product. A common type of electrochemical fuel cell comprises a membrane electrode assembly (MEA), which includes a polymeric ion (proton) transfer membrane between an anode and a cathode and gas diffusion structures. The fuel, such as hydrogen, and the oxidant, such as oxygen from air, are passed over respective sides of the MEA to generate electrical energy and water as the reaction product. A stack may be formed comprising a number of such fuel cells arranged with separate anode and cathode fluid flow paths. Such a stack is typically in the form of a block comprising numerous individual fuel cell plates held together by end plates at either end of the stack.

It is important that the polymeric ion transfer membrane remains hydrated for efficient operation. It is also important that the temperature of the stack is controlled. Thus, coolant water may be supplied to the stack for cooling and/or hydration. Accordingly a fuel cell system may include a water/coolant storage tank for storing water for hydration and/or cooling of the fuel cell stack, for example. If the fuel cell system is stored or operated in sub-zero conditions, the water in the fuel cell stack and water storage tank may freeze. The frozen water may cause blockages that hinder the supply of coolant or hydration water to the fuel cell stack. This is a particular problem on shut-down of the fuel cell system when the water in the water storage tank is no longer heated by its passage through the stack and may freeze completely. In such an event sufficient liquid water may not be available for hydration and/or cooling. This may prevent the fuel cell stack from being restarted or operating at full power until the frozen water has been thawed. It is known to provide a heater in the fuel cell system, which operates on stored energy, such as from a battery, and maintains the fuel cell system at above-zero temperatures to prevent freezing occurring. The battery power is, however, limited and the fuel cell system may experience freezing if the battery fails or becomes discharged.

BRIEF SUMMARY OF THE INVENTION

According to a first aspect of the invention we provide a coolant storage tank for storing coolant in a fuel cell system, the coolant storage tank comprising a plurality of individually controllable heater elements.

This is advantageous as this arrangement of heater elements has been found to be particularly effective for quickly and efficiently frozen coolant in the coolant storage tank. This enables the fuel cell system, which the tank supplies with pure coolant, to be supplied with the coolant it requires quickly so that it can operate at full power. The coolant is typically water although it may comprise glycol or other coolant.

The coolant tank may be associated with a controller, the controller configured to sequentially activate the individually controllable heater elements. Sequential activation may comprise additionally activating the heater elements over time. It may comprise activating a first heater element, then subsequently activating a second heater element while deactivating or changing the power delivered to the first heater element. The controller may be configured to "sequentially activate" over time or in response to a measure of how the coolant is melting in the tank.

At least one of the plurality of individually controllable heater elements may comprise;
 a heater element located at or in a base of the coolant storage tank;
 a heater element extending upwardly from a base of the coolant storage tank;
 a heater element extending downwardly from an upper surface of the tank;
 a heater element located along a side of the tank; and
 a heater element extending from a side of the tank.

The coolant storage tank may comprise a first heater element located at a base of the coolant storage tank and a second heater element extending upwardly from the base or downwardly from an upper surface. The provision of a base heater in combination with a heater that extends upwardly or downwardly from the base/upper surface has been found to provide efficient thawing of the frozen coolant.

The coolant storage tank may include two or more heater elements that are spaced in a vertical direction, and a first of the individually controllable heater elements may be disposed at the bottom of the tank. The provision of heater elements distributed vertically in the tank is advantageous as heat is delivered at a plurality of levels in the tank.

The plurality of controllable heater elements or a subset thereof may each be heated using at least one of ohmic or inductive heating. Further, the plurality of controllable heater elements or a subset thereof may comprise a local heater element which is configured to generate heat within the tank. Alternatively, the heater elements may comprise remote heater elements which are configured to include a heat transfer element to transfer heat generated outside the tank to the tank. For example, a heat pipe may transfer heat generated by a flow of exhaust gas into the tank or a hydrogen catalytic heater or flammable gas burner may transfer heat to the tank via a working fluid and heat exchanger that is located in the tank. The use of the same fuel as used in the fuel cell of which the coolant storage tank may form part is advantageous.

The coolant storage tank may comprise a first coolant storage compartment and a second coolant storage compartment, the second coolant storage compartment in fluid communication with the first coolant storage compartment, wherein the first coolant storage compartment includes the individually controllable heater elements and the second coolant storage compartment is unheated. The provision of an unheated compartment allows the heater's energy to be focussed on a proportion of the coolant in the tank to improve start-up times of the fuel cell system.

The second coolant storage compartment may be separated from the first coolant storage compartment by a wall, the wall including an aperture therein for providing fluid communication between the compartments. The wall substantially prevents convection currents from entering the second compartment thereby helping to thaw the coolant in the first compartment by limiting the amount of frozen coolant the heat from the heater elements is applied to.

According to a further aspect of the invention we provide a fuel cell system comprising the coolant storage tank of the first aspect.

This is advantageous as the coolant storage tank can supply a fuel cell stack with coolant quickly in the event of freezing conditions.

A controller may be provided which is configured to activate the individually controllable heater elements. The control circuit may be configured to sequentially activate the individually controllable heater elements.

The controller may be configured to monitor a rate of fluid delivered from the tank and control the plurality of individually controllable heater elements accordingly.

The fuel cell system may be configured to drive coolant in the fuel cell system to the coolant storage tank and/or arranged such that coolant drains to the coolant storage tank at least on shut-down of the fuel cell system.

The fuel cell may be configured to provide power to said individually controllable heater elements. Alternatively, or in addition, stored energy or energy from an alternative source may be used to power the heater elements. The controller may be configured to activate a first heater element of the plurality of individually controllable heater elements for a first period (possibly using power from the fuel cell) at a first power level, provide coolant heated by said first heater element from the tank to said fuel cell and activate at least one of the plurality of heater elements for a second period (possibly using power from the fuel cell) at a second power level. The second power level may be higher than the first power level.

According to a further aspect of the invention, we provide a method of melting frozen coolant in a coolant storage tank of a fuel cell system, the coolant storage tank including at least one heater element for melting frozen coolant within said tank, said coolant storage tank configured to supply coolant to a fuel cell of the fuel cell system for at least cooling the fuel cell during operation, the method comprising the steps of;
  operating said fuel cell without coolant from the coolant storage tank;
  operating in a first melt mode comprising activating the at least one heater element to melt at least part of the frozen coolant within the coolant storage tank;
  supplying the melted coolant to the fuel cell;
  operating in a second melt mode different to the first melt mode.

This is advantageous as the fuel cell can be operated without coolant cooling for a limited period of time in the first melt mode to liberate a small quantity of coolant from the frozen coolant tank. Once a quantity of coolant is received from the coolant tank for cooling the fuel cell stack, which may comprise less than the total amount of frozen coolant in the tank, a second melt mode can be adopted to melt a further quantity of the frozen coolant in the tank. The further mode may utilise different heaters located at different positions in the tank. Thus, the first heater may melt the frozen coolant in a first zone in the tank and a second heater may melt the coolant in a second zone. By dividing the tank into zones using a plurality of individually controllable heaters, the frozen coolant in the tank is melted incrementally at different localities in the tank. Thus, the first melt mode may be used to melt a small quantity of coolant such that the fuel cell can be cooled to a level that enables a higher power output from the fuel cell. The use of individually controllable heaters enables the method to apply different melting modes depending on the quantity of coolant that has been liberated from the frozen coolant in the tank at a particular time. The melt modes may comprise controlling which heaters are active, which are unactive, or the power supplied to the heaters. The fuel cell or a battery or other stored energy may be used to power the heater elements and different power sources may be used in different modes. For example, the fuel cell may power the heaters in the first and second modes. Alternatively, a battery may be used for the first melt mode and the fuel cell for the second melt mode.

The coolant storage tank may comprises a first heater element and a second heater element and wherein the first melt mode comprises activating the first heater element and the second melt mode comprises activating the second heater element. The second heater element may be activated in addition to the first heater element. Alternatively, the second heater element may be activated and the first heater element is deactivated (or the power supplied altered).

In the second melt mode, more power may be supplied to the heater element(s) from the fuel cell than in the first melt mode. Thus, as the frozen coolant is melted, coolant is available to the fuel cell for cooling. Accordingly, the power output of the fuel cell can be increased and supplied to the heater elements in the tank for thawing more coolant.

The first melt mode may be operated for a first period of time and the second melt mode may be operated subsequently for a second period of time. The period of time may be predetermined or it may be calculated by monitoring parameters of the fuel cell during operation, such as fuel cell temperature, power output or exhaust composition, for example.

The melt modes may comprise a substantially continuous ramp up in power supplied to the heater elements as power becomes available from the fuel cell.

At least one further melt mode may be provided for subsequent operation after the first and second melt modes, the further melt mode(s) comprising;
  a) activating a different heater element or combination of heater elements than a previous melt mode; or
  b) operating the heater element(s) at a different power level than a previous melt mode.

The heater elements may be sized, shaped or configured to operate effectively during each of the melt modes, which can advantageously make good use of the power available from the fuel cell during each mode. Thus, a first heater element, which may be active during a first melt mode may be located near the outlet of the coolant tank so that the coolant obtained by melting the frozen coolant can be easily extracted from the tank for supply to the fuel cell. Alternatively or in addition, the heater element active during the first melt mode may be smaller than the one or more other heater elements or configured to dissipate its heat in a smaller volume of the tank than the one or more other heater elements. Thus, the heater element may concentrate its heat output (possibly from limited output power of the fuel cell) on a small volume of frozen coolant so that it can melt that frozen coolant and supply the resulting coolant to the fuel cell. The fuel cell may then be able to increase its power output with that small amount of coolant that is now available. Further heater elements, which may be configured such that their heat output is not as concentrated in such a small volume, can then be activated at a higher power level, which may now be available for melting more of the frozen coolant in the tank.

The fuel cell system as described above may be configured to operate in accordance with the method of the above aspect. The method of operation may be applied to any of the other aspects of the invention.

According to a third aspect of the invention, we provide a coolant storage tank for storing coolant in a fuel cell system comprising a first heater element located at or in a base of the coolant storage tank and a second heater element comprising at least one of;
- a heater element extending upwardly from the base;
- a heater element comprising a plurality of heater sub-elements extending upwardly from the base;
- a heater element extending downwardly from an upper surface of the tank;
- a heater element comprising a plurality of heater sub-elements extending downwardly from an upper surface of the tank;
- a heater element extending along a side of the tank; and
- a heater element extending from a side of the tank.

This is advantageous as the coolant storage tank may have two or more active heat elements arranged at different locations in the tank for efficiently melting frozen coolant that may form in the tank. The second heater element may extend into the tank to effectively thaw frozen coolant that may form around it in the tank. The heater elements may comprise elongate heaters that cantilever from the base, upper surface, a lid or side of the tank or may comprise a plurality of sub-heaters arranged in a chain. The sub-heaters may be individually controllable.

The first heater element may form at least part of the base of the coolant storage tank. The first heater element may extend over the substantially the whole base or only a part of it. If it extends over only part of the base, it may do so at a tank outlet region, adjacent the outlet of the tank.

The second heater element may receive electrical power through the base of the water storage tank. The first and second heater elements may be individually controllable. The first heater element may comprise an electrically powered heater element.

The second heater element may comprise a heat pipe having an evaporator end and a condenser end, the evaporator end arranged to receive heat from the first heater element.

The second heater element may comprise an elongate member. This is advantageous as the heater element can extend into the mass of frozen coolant should the coolant in the tank freeze.

Further heater elements may be provided. Further heater elements in the base may be provided and/or further heater elements that extend upwardly from the base may be provided and/or further heater elements that extend downwardly from the upper surface.

The coolant storage tank may include a third heater element, located at least partly above or below the second heater element, the third heater element being individually controllable.

Optionally, the second heater element comprises a proximal end located at the base or upper surface of the tank and a distal end opposite the proximal end, the third heater element arranged to extend from the distal end of the second heater element. A plurality of third heater elements may be provided.

A controller may be configured to activate the heater elements based on the level of coolant in the coolant storage tank. A controller may be configured to maintain coolant within the coolant storage tank for a period after activation of the heater elements. The period may comprise a predetermined amount of time. The period may be determined using a measure of the energy supplied to the first and/or second heater elements. This is advantageous as supplying more energy than required to just melt the coolant, reduces the risk of it refreezing when it leaves the water tank.

The coolant storage tank may comprise a first coolant storage compartment and a second coolant storage compartment, the second coolant storage compartment in fluid communication with the first coolant storage compartment, wherein the first coolant storage compartment includes the first and second heater elements and the second coolant storage compartment is unheated.

The second coolant storage compartment may be separated from the first coolant storage compartment by a wall, the wall including an aperture therein for providing fluid communication between the compartments.

According to a fourth aspect of the invention we provide a fuel cell system comprising the coolant storage tank of the third aspect of the invention.

According to a fifth aspect of the invention we provide a coolant storage tank for storing coolant in a fuel cell system, the coolant storage tank comprises a first coolant storage compartment and a second coolant storage compartment, the second coolant storage compartment in fluid communication with the first coolant storage compartment, the first coolant storage compartment including at least a first heater element and wherein the second coolant storage compartment is unheated.

The second coolant storage compartment may be separated from the first coolant storage compartment by a partition wall, the wall including an aperture therein for providing fluid communication between the compartments.

The first heater element may form at least part of the base of the first coolant storage compartment.

The coolant storage tank may include a plurality of individually controllable heater elements.

The first coolant storage compartment may include a first heater element located at a base of the coolant storage compartment and a second heater element extending upwardly from the base. Alternatively, the second heater element may extend downwardly from an upper surface of the tank. The second heater element may comprise an electrically powered heater element. The second heater element may comprise a heat pipe having an evaporator end and a condenser end, the evaporator end arranged to receive heat from the first heater element. The second heater element may comprise an elongate member. A plurality of second heater elements may be provided.

The coolant storage tank may include a third heater element, located at least partly above the second heater element or elements, the third heater element being individually controllable. A plurality of third heater elements may be provided.

A controller may be configured to activate the heater elements based on the level of coolant in the coolant storage tank. A controller may be configured to maintain coolant within the coolant storage tank for a period after activation of the first heater element wherein the period comprises;
   a) a predetermined amount of time; or
   b) the period is determined using a measure of the energy supplied to the first and/or second heater elements.

The first coolant storage compartment may include a plurality of individually controllable heater elements.

According to a sixth aspect of the invention, we provide a fuel cell system comprising the coolant storage tank of the fifth aspect of the invention.

DESCRIPTION OF THE DRAWINGS

There now follows, by way of example only, a detailed description of embodiments of the invention with reference to the following figures, in which.

DETAILED DESCRIPTION OF THE INVENTION

The figures show a coolant storage tank 1 of a fuel cell system 2. In this example, the coolant comprises water, although it will be appreciated that other coolants could be used. Further, it will be appreciated that the storage tank of the invention may store liquids other than coolant and has application in liquid storage tanks that experience freezing conditions or in which the liquid requires heating. The coolant or water storage tank 1 stores pure water for the hydration and evaporative cooling of a fuel cell stack 3.

Figure 1:
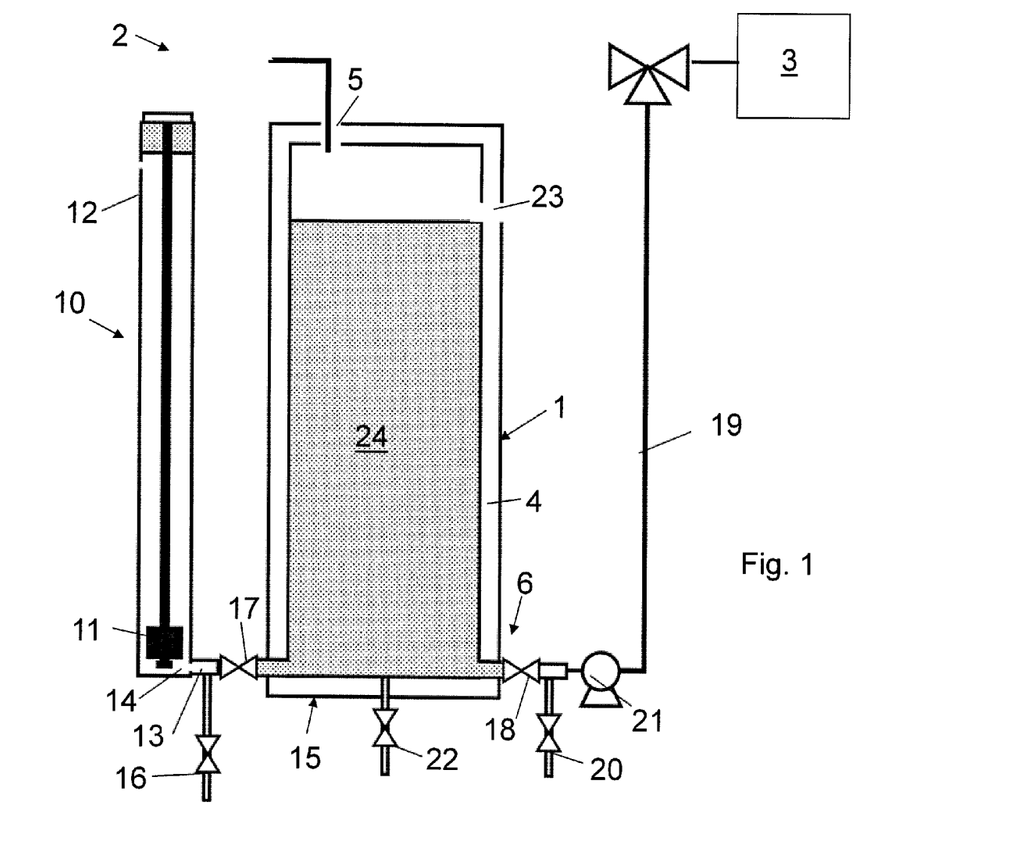
FIG. 1 shows an example coolant storage tank of a fuel cell system.

The water storage tank 1 comprises a hollow body 4 having an inlet 5 for receiving water, which may be extracted from an exhaust fluid flow of the fuel cell stack 3, and an outlet 6 for supplying water for use by the fuel cell stack 3. The water storage tank 1 includes a plurality of individually controllable heater elements 7, 8a, 8b (shown in the more detailed view of FIG. 2).

The water storage tank 1 further includes a gauge 10 for displaying to a user how much water is present in the water storage tank 1. The structure of such a gauge will be known to those skilled in the art and will only be described briefly here. The gauge 10 comprises a hollow column 12 containing a float 11. A flow path 13 connects a base 14 of the column 12 to a base 15 of the water storage tank 1 such that they are in fluid communication. Water in the water storage tank 1 is able to enter the column 12 via the flow path 13 and act on the float 11 to show the water level. As an alternative or in addition to the gauge 10, a level sensor, such as a capacitive sensor may be present in the tank or column 12. The level sensor may include a display for displaying its output. The sensor may report the level to a controller, which may use the information to sequentially activate heaters and/or choose which heaters to activate. A drain 16 is present in the flow path 13 for draining water from the column 12. A valve 17 is also provided in the flow path 13 between the water storage tank 1 and the drain 16 to control the flow of water from the tank 1 to the column 12.

The outlet 6 includes a valve 18 for controlling the flow of water from the tank 1 out of the outlet 6 into an outlet conduit 19, which transports water to the remainder of the fuel cell system. A drain 20 is also provided at the outlet 6 downstream of the valve 18 for draining the outlet conduit 19. The outlet conduit 19 includes a pump 21 for pumping water from the tank along the outlet conduit 19 to the fuel cell stack. The body 4 includes a further drain 22 in the base 15 of the tank 1 and an air inlet 23.

Figure 2:
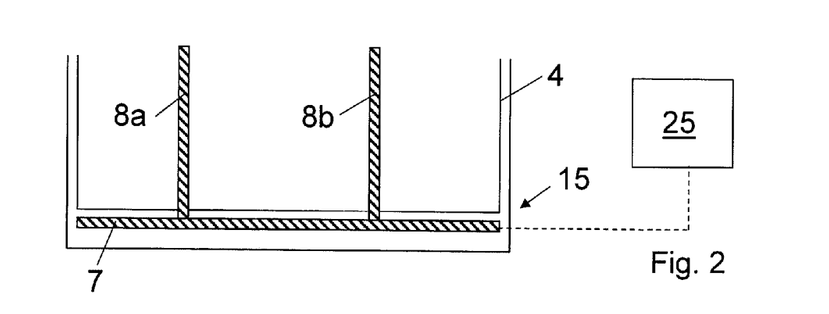
FIG. 2 shows a diagrammatic view of a first example coolant storage tank including heater elements.

FIG. 2 shows the base 15 of the water storage tank 1. A first heater element comprising a base heater element 7, is located within the base 15 of the body 6. The base heater element 7 may comprise a plate heater that extends over the base of the body 4. The base heater element 7 is an electrically powered heater element. A second heater element, comprising an upward heater element 8a, extends substantially upwards from the base 15. The upward heater element 8a comprises an elongate member that extends into the hollow interior of the water storage tank 1. The upward heater 8a is an electrically powered heater element and receives its electrical power through the base 15. The upward heater element 8a is separately controllable from the base heater element 7. In this embodiment, a second upward heater element 8b is provided (which may be considered a third heater element). The second upward heater element 8b takes the same form as the first upward heater element but extends from a different part of the base 15. The second upward heater element 8b can be controlled separately from the base and first upward heater elements 7, 8a.

FIG. 1 shows the water storage tank 1 on shut down of the fuel cell system 2. The system 2 may be configured and arranged such that liquid water 24 in the system 2 will drain to the water storage tank 1. Alternatively or in addition, the fuel cell system 2 may actively drive water to the water storage tank at least on shut down of the fuel cell system. Thus a purge gas may be used to flush any liquid water out of the fuel cell stack 3 for example and into the water storage tank 1.

The valve 17 and the valve 18 are actuated to prevent water in the water storage tank 1 leaving the tank 1 via the flow path 13 and outlet 6. The drains 16 and 20 are opened to drain the column 12 and the outlet conduit 19 of any water that may be present therein. This ensures the gauge 10, outlet 6 and outlet conduit 19 remain clear of any ice that may form.

In the event of freezing conditions, the water 24 in the tank 1 is allowed to freeze. The system 2 may not include an auxiliary heater to maintain an above-freezing temperature while the system 2 is powered down. On restarting the system 1, water may be required for cooling the fuel cell stack 3 and/or hydration of the fuel cell membranes. Thus, if the water in the tank 1 is frozen, it must be thawed quickly so that it is available to the stack 3.

The stack 3 may be started at a reduced power level, such as 10% of normal power, without injecting any water for evaporative cooling from the water tank. The oxidant may be driven through the stack such that it operates at high stoichiometry in order to keep the stack cool until water from the tank 1 is available for evaporative cooling. The electrical power generated by the stack 3 is, in this example, used to power the heater elements 7, 8a, 8b. This is advantageous as the power required to melt the ice is generated by the stack itself rather than by draining a battery. It is known that batteries may experience low performance in cold temperatures and therefore using the stack power, possibly operating in a low power mode, is beneficial. The heater elements are individually controllable and therefore may be activated as required. In this example, a controller 25 activates all of the heater elements; the base heater element 7 and the two upward heater element 8a and 8b. The heater elements will melt the ice in the tank. The controller 25 may retain valve 18 in the closed position for a heating period after the heater elements 7, 8a, 8b have begun to melt the ice. This will retain water around the heater elements to act as a conductor/convection medium to assist in melting the remainder of the ice in the tank 1. The heating period may comprise a predetermined period of time. Alternatively, the heating period may be determined based on the amount of ice that has been melted, which may be determined by measuring the current draw of the heater elements, using a temperature sensor in the tank 1 or any other suitable means.

The valve 18 may then be opened (with drain 20 now closed) to allow water to be supplied to the fuel cell stack 3. The valve 17 may also be opened (with drain 16 now closed) to activate the gauge 10. As water becomes available from the tank 1, the power output of the stack 3 may be increased. Accordingly, more power may be available to the heater elements to thaw any remaining ice. Alternatively, the additional power may be provided for other uses.

As the melted water leaves the tank 1 for use in the system 2, the controller 25 may deactivate the upward heaters 8*a* and 8*b*. For example, if the water/ice level in the tank 1 is below that of the upward heaters 8*a*, 8*b*, then they will not effectively heat the ice. Thus, it is advantageous for the controller 25 to deactivate the upward heater elements 8*a*, 8*b*. Alternatively, the controller 25 may deactivate all of the heater elements 7, 8*a*, 8*b* as soon as sufficient water is available for the stack, whether or not there is still ice present in the tank 1. Accordingly, the system 2 may rely on water, which has been heated by its passage through the stack, entering or re-entering the tank 1 to thaw any remaining ice. Alternatively, the controller 25 may wait for all the ice to have melted before deactivating all of the heater elements 7, 8*a*, 8*b*. The combination of a base heater and at least one upward heater has been found to provide an efficient way of thawing ice in the water tank. The provision of individually controllable heater elements is also advantageous because, for example, the heater elements that can effectively melt the ice can be activated in preference to others.

A further method of operation may comprise a first melt mode and a second melt mode operated sequentially. The melt modes may differ with respect to the heater element that is active, the combination of heater elements that are active, the power supplied to the or each heater element or a combination of the above. As an example, the method of melting ice in the water storage tank of a fuel cell system may comprise operating the fuel cell stack 3 without evaporative cooling using water from the tank 1 at a reduced power. The reduced power generated by the stack 3 may be supplied to the heater elements operating in the first melt mode. In the first melt mode, in this example, one of the heater elements 8*b* is supplied with power while the other heater element are not active. It has been found that the fuel cell stack can be run for a limited period of time without evaporative cooling. By focussing the power generated during this limited period of time into one of the heater elements, a proportion of the ice may be thawed. This water may then be supplied to the fuel cell stack for evaporative cooling of the stack. With this limited quantity of water available it has been found that the fuel cell stack can be operated at a higher power. Thus, a different, second melt mode can be used to melt a further quantity of water.

The second melt mode may comprise using the additional power obtained from the fuel cell stack 3 to activate a further one of the plurality of heater elements, such as heater element 8*a*. Thus, in the second melt mode, the heater element 8*a* may be activated to melt the ice around it. In the first melt mode, the heater element 8*b* is used to melt the ice around it for supplying to the fuel cell stack 3. In the second melt mode, a different quantity of ice, at a different location in the tank, that which surrounds heater element 8*b* is melted. Alternatively both heater elements 8*a* and 8*b* may be activated.

The use of individually controllable heaters allows a controller to activate the heaters sequentially as power from the fuel cell stack becomes available. Further, as more water is melted from the water tank, the fuel cell stack can be operated at higher powers. Thus, the provision of different melt modes applied sequentially can advantageously use the power that is available. The position of the heater elements in the tank conceptually breaks the tank into zones such that sections of an ice mass in the tank can be incrementally melted.

The melt modes may be applied for predetermined periods of time. For example, the first melt mode may be operated for 30 seconds before moving to the second melt mode. Alternatively, the duration of each melt mode may be determined by monitoring the performance of the heater elements and/or the fuel cell stack. For example, the controller may measure the quantity of water that is melted during a particular mode and may move to the next mode when a predetermined quantity of water is received from the tank. Alternatively or in addition, the controller may measure the temperature of the fuel cell stack 3, and determine when the transition between modes should occur.

Further melt modes may be provided and may comprise activating a different heater element or combination of heater elements than a previous melt mode; or operating the heater element(s) at a different power level, supplied from the fuel cell to the heater elements, than a previous melt mode.

The heater element configured to be operated during the first melt mode may have a different configuration and/or location to the other heater elements. For example, it may be located closest to a water outlet of the water tank. Alternatively or in addition, its energy output per unit volume it occupies may be higher than other heater elements in the tank. This is advantageous as in the first melt mode, limited power may be available but melting a small quantity of water quickly has been found to enable the power output of the fuel cell to be increased, thereby aiding further melting of ice. Providing a compact heater element for activation during the first melt mode may enable effective and rapid melting of a small quantity of ice during the first melt mode.

Figure 3:
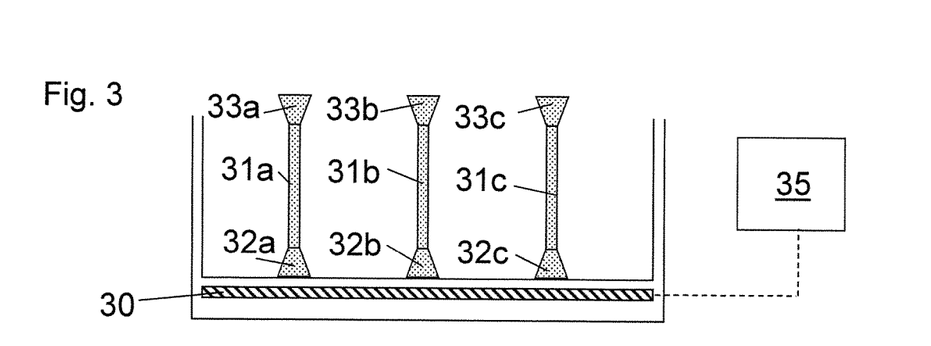
FIG. 3 shows a diagrammatic view of a second example of the heater elements in the coolant storage tank.

FIG. 3 shows an alternative arrangement of the heater elements in the tank 1. In this example, an electrically powered base heater element 30 is provided as in the previous example. Three second heater elements comprising upward heater elements 31*a*, 31*b*, 31*c* are provided. However, in this example, the upward heater elements 31*a-c* comprise heat pipes rather than electrically powered heater elements. The heat pipes 31*a-c* are arranged to transfer thermal energy from the base heater element 30 into the mass of ice that may form in the tank 1. The heat pipes 31*a-c* each comprise an evaporating end 32*a-c* and a condensing end 33*a-c*. The evaporating ends 32*a-c* are located in contact with the base of the tank 1 and therefore receive thermal energy from the base heater element 30. A working fluid present in each heat pipe absorbs thermal energy at the evaporating end 32*a-c* and evaporates. The working fluid is transported along the pipe to the condensing end 33*a-c* where the thermal energy is transferred to the ice/water in the tank 1 and the working fluid condenses. The working fluid is then transported to the evaporating end 32*a*, 32*b*, possibly by wicking, to continue the cycle.

The heat pipes 31*a-c* may be of different heights and/or locations and may therefore extend to different points within the tank 1. For example, there may be a higher concentration of heater elements 30, 31a-c around the outlet 6. This would be advantageous as the ice would be melted more rapidly around the outlet 6 so that water is quickly available to flow from the outlet 6. This higher concentration of heater elements around the outlet can be applied to any heater element type described herein.

The operation of this embodiment is similar to the previous embodiment. However, the controller 35 only controls the single base heater 30 as the heat pipes 31a-c passively transfer thermal energy from the base heater element 30 to the interior of the tank 1. In a modification to FIG. 3, the base heater element 30 may be divided into several independently controllable sections. The sections may be arranged in any layout over the base 15, for example they may be concentric or divide the base into sectors. The sections may extend over a part of the base associated with one or more of the heat pipes. It will be appreciated that the division of the base heater into a plurality of individually controllable base heater sections can be applied to a water tank 1 with or without any second heater elements and whether or not they comprise heat pipes.

Figure 4:
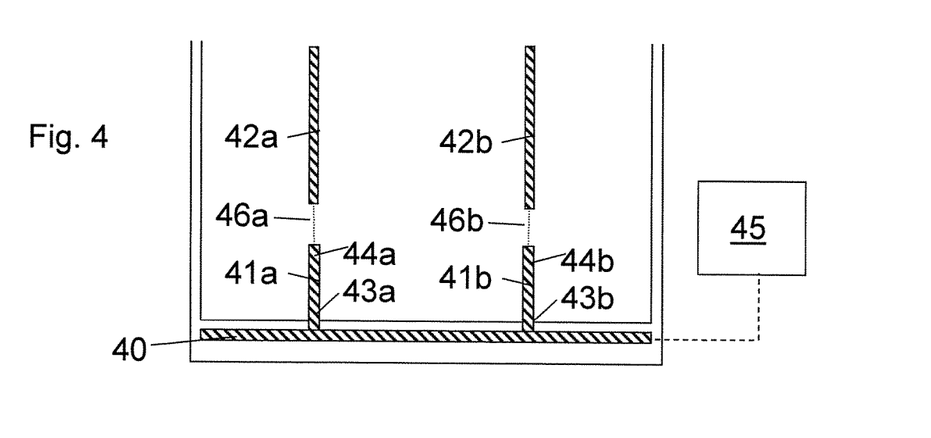
FIG. 4 shows a diagrammatic view of a third example of the heater elements in the coolant storage tank.

FIG. 4 shows an alternative arrangement of the heater elements in the tank 1. In FIG. 4, a first heater element comprising base heater element 40 is provided. Two second heater elements comprising upward heater elements 41a and 41b are also provided. The upward heater elements are electrically powered and receive the electrical power through the base 15. In this embodiment, third heater elements 42a, 42b are provided, comprising upper heater elements that extend higher in the tank 1 than the second heater elements 41a, 41b. The third heater elements 42a, 42b are electrically powered heater elements and have an elongate form. The upward or second heater elements 41a, 41b comprise a proximal end 43a, 43b that extends from the base 15 and a distal end 44a, 44b opposite the proximal end. The third heater elements 42a, 42b, in this example, extend from the distal end 44a, 44b of the upward heater elements 41a, 41b. The third heater elements 42a and 42b are controlled and receive electrical power through a connection 46a, 46b between the second and third heater elements.

In use, the controller 45 can individually control the base heater element 40, first upward heater element 41a, second upward heater element 41b, first upper heater element 42a and second upper heater element 42b. The controller 45 may initially activate all of the heater elements when ice is detected in the water tank 1. As in the first example, energy to power the heater elements may be obtained by operating the fuel cell stack in a reduced power mode until water from the tank 1 is available. Alternatively a further energy source may be used. As the ice melts and the ice/water level in the tank 1 falls, the controller may sequentially deactivate the heater elements. In particular, the controller 45 may first deactivate the upper heater elements 42a, 42b. As the ice/water levels drops further, the controller may deactivate the upward heater elements 41a, 41b and then, when sufficient water is available or when all of the ice has melted, for example, the controller may deactivate the base heater element 40.

Figure 5:
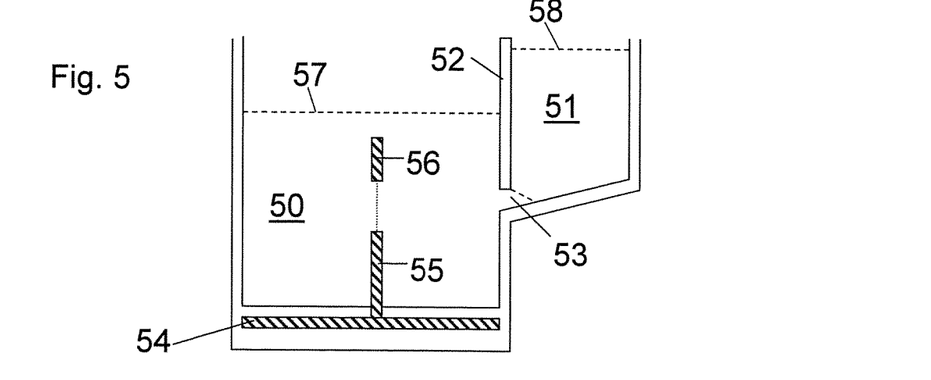
FIG. 5 shows a diagrammatic view of a fourth example coolant storage tank divided into compartments.

FIG. 5 shows a further example of a water storage tank 1. In this embodiment, the water storage tank 1 is divided into two compartments; a first compartment 50 and a second compartment 51. The second compartment 51 is separated from the first compartment 50 by a partition wall 52. The portion wall 52 includes an aperture 53 which provides fluid communication between the first and second compartments 50, 51.

The first compartment 50 includes a first heater element 54, a second heater element 55 and a third heater element 56 comprising a base heater element, upward heater element extending from the base 15 and an upper heater element respectively. The heater elements thus have a similar construction to that shown in FIG. 4 except that only one upward 55 and one upper heater element 56 is provided. The second compartment 51 does not contain any heater elements and is thus unheated. The second compartment may be located to the side of the first compartment and may be located such that it is not wholly directly above the heater elements. Further, the majority of the second compartment may be offset from an area extending above the heater elements. The partition wall may insulate the first compartment from the second compartment. This arrangement allows the heater elements to act primarily or wholly on the volume of ice/water in the first compartment 50.

The first compartment 50 is sized to hold a particular quantity of water, which may be the minimum amount of water required for the fuel cell system 2 to operate at full power or a particular power requirement less than full power (such as a power level of 30, 40, 50, 60, 70, 80 or 90 percent of full operating power). The second compartment 51 may hold additional water or the extra water required such that the fuel cell system can operate at full power.

The arrangement of the compartments is advantageous as the water storage tank compartmentalises the ice so that the heater elements can thaw a desired quantity (determined by the compartment sizes) of the ice for operation. This improves the start-up time of the fuel cell system achieving a desired output power.

In use, as in the first example, water in the system 2 may be driven, on shut-down, to the water storage tank 1 and may be received in either or both compartments 50, 51. The outlet 6 is located in the first compartment (as is the valve 17) and the aperture 53 allows water in the second compartment 51 to flow to the first compartment and leave the tank 1 by the outlet 6. The water is allowed to freeze in both compartments 50, 51.

On start-up of the fuel cell system 2, the heater elements 54, 55, 56 are activated which heats the ice in the first compartment 50. The offset location of the second compartment and the presence of the partition wall 52 allows the heater element 54, 55, 56 to thaw the ice in the first compartment without substantially acting on the ice in the second compartment 51. Any convection currents caused by the heater elements that may aid thawing do not substantially enter the second compartment 51 due to the partition wall.

Thus, the configuration of the tank promotes the thawing of ice in the first compartment 50 over the second compartment 51. FIG. 5 shows the ice/water level 57 in the first compartment 50 and the ice/water level 58 in the second compartment 51. The ice/water level 57 is lower than the ice/water level 58. FIG. 5 thus shows the water tank 1 after the heater elements 54, 55, 56 have been active for some time and have started to melt the ice in the first compartment 50.

The upper heater element 56 may be deactivated as the level 57 falls below it, followed by the upward heater element 55 and the base heater element 54. The ice in the second compartment 51 may remain frozen after the first compartment 50 has reached a minimum level and is supplying the required quantity of water to the fuel cell system 2. The water in the system 2 may be cycled through the water storage tank 1 and therefore the water entering the tank 1 may act to thaw the ice in the second compartment 51.

The system may be configured such that the ice in the second compartment 51 will thaw over time due to the increased system temperature associated with operation of the fuel cell system. Thus, even after the heater elements 54, 55, 56 have been deactivated, the water in the second compartment may thaw and enter the first compartment 50 through the aperture 53 to augment the water from the first compartment.

Given that the heater elements are concentrated on thawing only the minimum amount of ice required (due to its compartmentalisation in the water tank), the fuel cell system can operate efficiently and start-up quickly.

Figure 6:
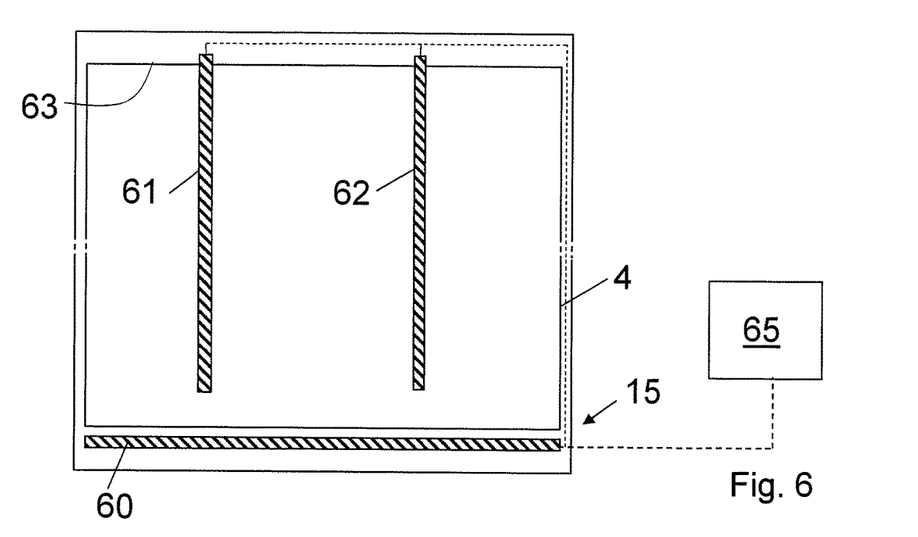
FIG. 6 shows a fifth example coolant storage tank having heater elements extending downwards.

FIG. 6 shows a further embodiment of an alternative arrangement of the heater elements in the tank 1. In FIG. 6, a first heater element comprising base heater element 60 is provided. A second heater element 61 and a third heater element 62 are also provided. The second and third heater elements both extend from an upper surface 63 of the tank downwardly into the hollow interior of the tank 1. The second and third heater elements are individually controllable. Further, the second and third heater elements are electrically powered and receive their electrical power through the upper surface 63.

The downwardly extending second and third heater element 61, 62 are located at different positions in the volume of the tank interior and can therefore be considered to be associated with a "zone" in the tank where that specific heater element is used to melt ice present in that zone. A controller 65 may be configured to activate the heaters as required, which may be over a plurality of melt modes during which the active heaters change and/or different amounts of power are supplied to the heater elements.

Figure 7:
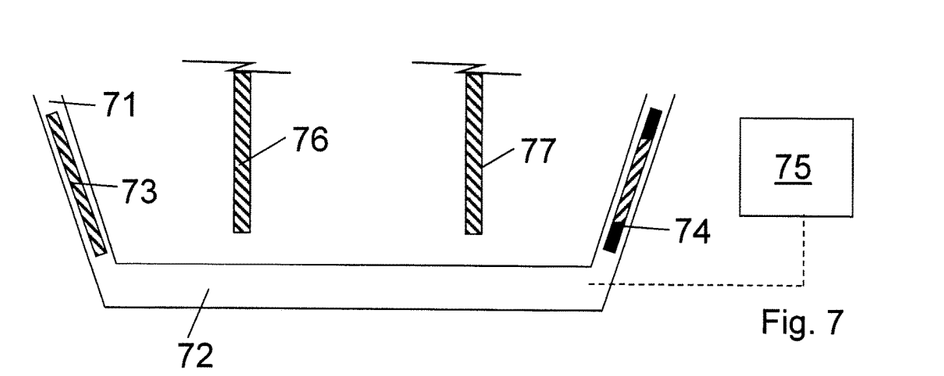
FIG. 7 shows a sixth example coolant storage tank having inclined side walls and heater element associated with the side walls.

FIG. 7 shows a further embodiment in which the tank 1 includes sloping side walls 71. The or each side wall of the tank is inclined such that the distance between the side walls decreases towards a base 72 of the tank 1. In this embodiment, a base heater element is not provided. A first heater element comprises a side wall heater 73 that extends within the body 4 of the tank 1 along the side wall. A second heater element comprises a further side wall heater 74 on an opposite side. Third and fourth heater elements 76, 77 are provided that extend downwardly from an upper surface (not shown) of the tank 1. The first, second, third and fourth heater elements are individually controllable and are controlled by controller 75. The controller 75 can implement any appropriate scheme for melting ice that may form within the tank 1. For example, it may be configured to sequentially activate one or more of the heater elements over a plurality of melt modes.

Figure 8:
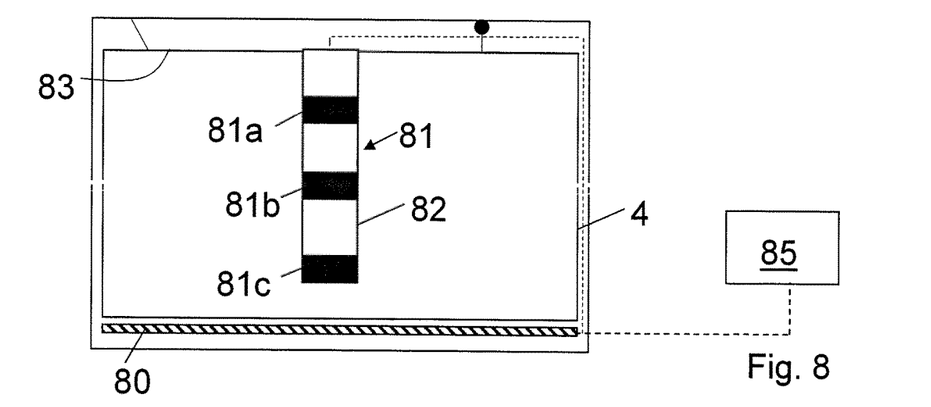
FIG. 8 shows a seventh example coolant storage tank.

FIG. 8 shows a further embodiment in which a first heater element 80 is present in a base of the tank and a second heater element 81 extends downwardly from an upper surface 83 of the tank. The upper surface of the tank from which the heater element depend may comprise a lid for gaining access to the tank. This is advantageous as the lid provides convenient access to the heater elements for servicing and the like. This configuration may be applicable to any of the above embodiments.

The second heater element comprises an elongate frame 82 which carries a plurality of sub-heater element 81*a*, 81*b* and 81*c* located at spaced locations along the frame. The sub-elements are individually controllable. The sub-heater elements, like the individually controllable heater elements described above, provide a further means for concentrating power from the fuel cell or other power source at particular locations within the tank 1.

Figure 9:
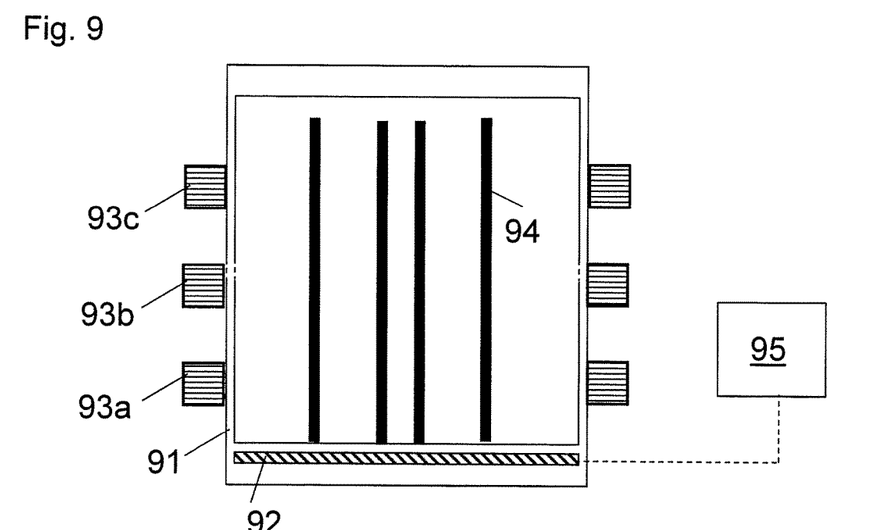
FIG. 9 shows an eighth example coolant storage tank.
Figures 10, 11:
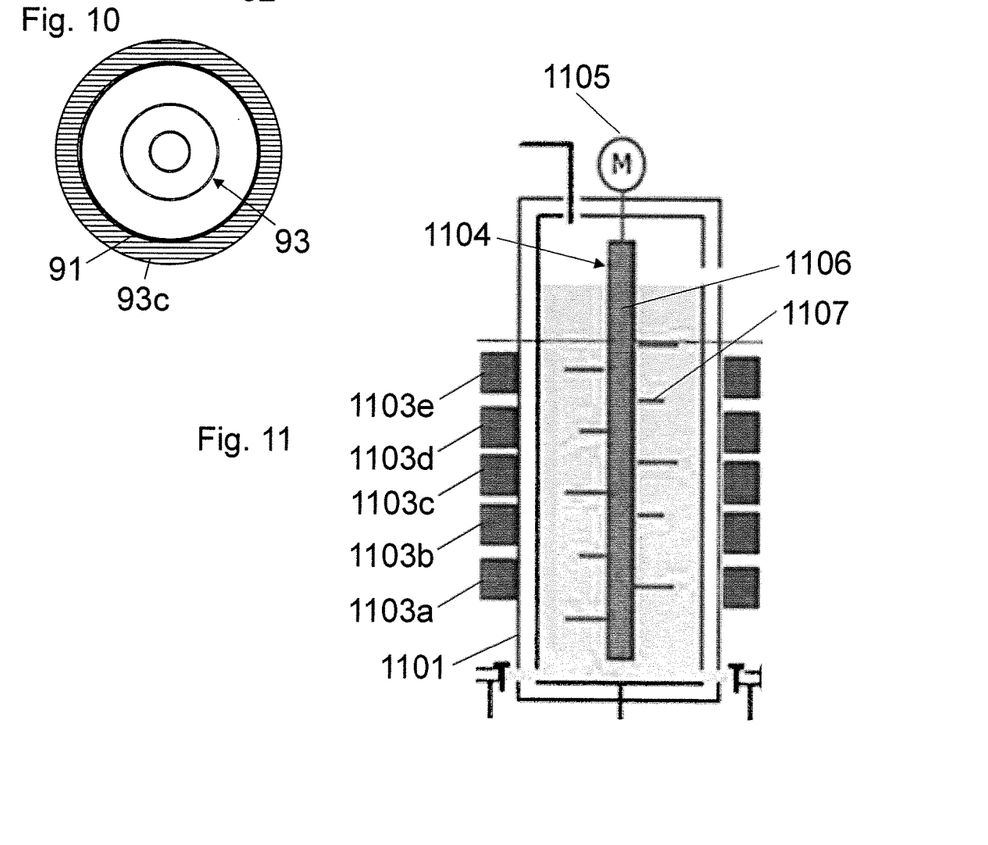
FIG. 10 shows a plan view of the tank shown in FIG. 9.
FIG. 11 shows a ninth example coolant storage tank.

FIGS. 9 and 10 show a further example having individually controllable heaters. The tank 91 includes a base heater element 92 and a plurality of inductive heater elements 93*a-c*. The inductive heater elements comprise induction coils that surround the tank and generate an electromagnetic field on the application of an alternating current. Thus, the coils of the inductive heater elements may be supplied by DC to AC converter, which receives a DC current from the fuel cell stack. The inductive heater elements are configured to act, by virtue of the electromagnetic field, on a conductive assembly, which in this example comprises a metal tube assembly 94 that extends within the tank. Although the inductive heater elements 93*a-c* are configured to act on a common conductive assembly, they are arranged at different (vertical) locations around the tank and therefore preferentially heat a localised portion of the conductive assembly. It will be appreciated that a plurality of conductive assemblies may be provided to each receive the inductive energy for the inductive heater elements or a subset thereof. Nevertheless, while a particular inductive heater element may primarily heat its associated conductive assembly, it may also induce a current in the other conductive assemblies associated with other inductive heater elements to a lesser degree. The metal tube assembly 94 comprises two concentric tubes of different diameter. The tubes may be perforated or have apertures therein to allow any melted coolant to circulate therearound. Thus, a controller 95 may individually control the base heater 92 and inductive heater elements 93*a-c*.

FIG. 11 shows a further example similar to the example shown in FIG. 9. In this example, five individually controllable inductive heater elements 1103*a-e* are provided at spaced locations around the tank 1101. The inductive heater elements 1103*a-e* are configured to induce heating in a conductive assembly 1104, which in this example comprises a stirrer. The stirrer 1104 is configured to rotate in the tank 1101 and a motor 1105 provides the motive force. A base heater is not provided in this example, but could be included. The stirrer 1104 comprises a rotatable shaft 1106 and a plurality of arms 1107 extending therefrom. The stirrer 1105 may be advantageous in that it can move melted or partially melted ice around the tank to encourage heat transfer through the tank 1101.

Figure 12:
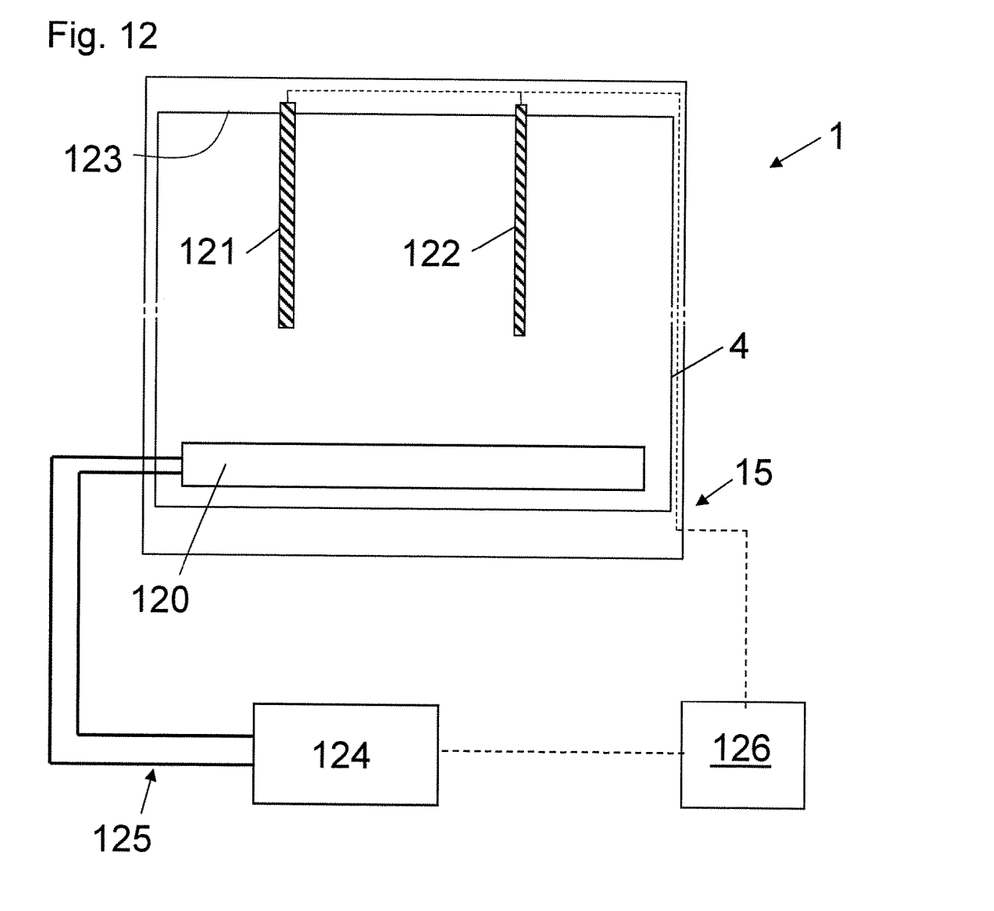
FIG. 12 shows a tenth example coolant storage tank.

FIG. 12 shows a further example similar to that shown in FIG. 6. FIG. 12 shows a first heater element comprising a heat exchanger 120. The heat exchanger 120 is located at the base of the tank 1. A second heater element 121 and a third heater element 122 are also provided. The second and third heater elements 121, 122 both extend from an upper surface 123 of the tank downwardly into the hollow interior of the tank 1. The first, second and third heater elements are individually controllable.

The heat exchanger 120 comprises a remote heater as it is supplied with heat from a heat source outside the tank 1 rather than generating heat in situ. The heat exchanger 120 is supplied with heat from a hydrogen catalytic heater 124. The hydrogen catalytic heater uses a catalyst to oxidise a hydrogen fuel to generate heat. The hydrogen catalytic heater 124 transfers the heat generated to a working fluid, which is circulated via conduits 125 to the heat exchanger 120. The heat exchanger 120 thus transfers the heat to melt any ice within the base of the tank 1. The use of a hydrogen catalytic heater is advantageous as a source of hydrogen for the fuel cell is readily available. The second and third heater elements 121, 122 are electrically powered.

The first, second and third heater elements 121, 122 are located at different positions in the volume of the tank interior and can therefore be considered to be associated with a "zone" in the tank where that specific heater element is used to melt ice present in that zone. A controller 126 may be configured to activate the heaters 124/120, 121, 122 as required, which may be over a plurality of melt modes during which the active heaters change and/or different amounts of power are supplied to the heater elements, as described in relation to previous embodiments.

It will be appreciated that the heater elements discussed in the examples above may be of other types or a combination of types. For example, the heater elements may be of a type that generates heat in a part that extends within the tank, such as an electrical resistance heater, an inductive heater or a heater element containing a phase change material which generates heat by a reversible exothermic chemical reaction. The heater elements may also comprise elements that receive heat from a remote heat generation location to the tank. For example, the tank may include a heat exchanger that receives a heated heat transfer fluid, such as a glycol/water mix (the heat transfer fluid having a freezing temperature lower than the coolant in the tank). A heat pipe may be used to direct heat into the tank. The heat pipe or pipes may connect to a heat transfer device, such as a heat exchanger, in the tank. Electrical resistance heaters or inductive heaters may be arranged to heat a part of a heat transfer element outside the tank, the heat transfer element configured to transfer the heat to the tank. The heat transfer element may comprise a heat pipe or other thermally conducting member. The heat or energy for heat generation may be supplied by an air-cooled fuel cell, a battery, a catalytic or non-catalytic hydrogen burner, a flammable gas burner, an exhaust gas heat exchanger which may use gases exhausted from the fuel cell stack, a capacitor or supercapacitor and/or a heat storage battery, such as Schatz device.

It will be appreciated that further heater elements may be provided, of the base, upward or upper type, extending downward from an upper surface of the tank or from the sides or further heater elements arranged higher or at other positions in the tank 1. Further, combinations of the above heater elements may be provided in the tank 1. The heater elements may include fins, bristles, spokes or other passive heating elements to distribute the thermal energy throughout the ice mass in the water tank. The heater elements may have different shapes or orientations to those described. For example, the third heater elements may be inclined to the upward direction of the second heater elements. The controller may heat the water in the tank when it is not frozen.

The invention claimed is:

1. A coolant storage tank for storing coolant in a fuel cell system, the coolant storage tank comprising a plurality of individually controllable heater elements,
    wherein the coolant tank is associated with a controller, the controller configured to sequentially activate the individually controllable heater elements;
    wherein the controller is configured to activate a first heater element of the plurality of individually controllable heater elements for a first period at a first power level, provide coolant heated by said first heater element, and activate at least one other of the plurality of heater elements for a second period at a second power level;
    wherein the energy output per unit volume occupied by the first heater element is higher than the energy output per unit volume occupied by the second heater element.

2. The coolant storage tank of claim 1, in which at least one of the plurality of individually controllable heater elements comprises;
    a heater element located at a base of the coolant storage tank;
    a heater element extending upwardly from a base of the coolant storage tank;
    a heater element extending downwardly from an upper surface of the tank;
    a heater element located along a side of the tank; or
    a heater element extending from a side of the tank.

3. The coolant storage tank of claim 1 in which the coolant storage tank includes two or more heater elements that are spaced in a vertical direction.

4. The coolant storage tank of claim 1 in which the coolant storage tank comprises a first coolant storage compartment and a second coolant storage compartment, the second coolant storage compartment in fluid communication with the first coolant storage compartment, wherein the first coolant storage compartment includes the individually controllable heater elements and the second coolant storage compartment is unheated.

5. The coolant storage tank of claim 4, in which the second coolant storage compartment is separated from the first coolant storage compartment by a wall, the wall including an aperture therein for providing fluid communication between the compartments.

6. The coolant storage tank of claim 1, wherein the controller is configured to monitor fluid delivered from the tank and control the plurality of individually controllable heater elements accordingly.

7. A fuel cell system comprising a fuel cell, the coolant storage tank of claim 1, and a controller,
    wherein the controller configured to sequentially activate the individually controllable heater elements of the coolant storage tank, and
    wherein the fuel cell system is configured to drive coolant in the fuel cell system to the coolant storage tank or arranged such that coolant drains to the coolant storage tank at least on shut-down of the fuel cell system.

8. A fuel cell system comprising a fuel cell, a controller, and a coolant storage tank of claim 1,
    wherein said coolant storage tank is configured to supply coolant to the fuel cell of the fuel cell system for at least cooling the fuel cell during operation,
    wherein the fuel cell system and controller are configured to:
        operate the fuel cell without coolant from the coolant storage tank;
        operate in a first melt mode comprising activating the first heater element to melt at least part of the frozen coolant within the coolant storage tank;
        supply the melted coolant to the fuel cell; and
        operate in a second melt mode comprising activating the second heater element.

9. The coolant storage tank of claim 1,
    wherein the first heater element is located at a base of the coolant storage tank; and
    wherein the second heater element comprises one of:
        a heater element extending upwardly from the base;
        a heater element comprising a plurality of heater sub-elements extending upwardly from the base;
        a heater element extending downwardly from an upper surface of the tank;
        a heater element comprising a plurality of heater sub-elements extending downwardly from an upper surface of the tank;
        a heater element extending along a side of the tank; and
        a heater element extending from a side of the tank.

10. A fuel cell system including the coolant storage tank of claim 9.

11. The coolant storage tank of claim 9, wherein the coolant storage tank comprises a first coolant storage compartment and a second coolant storage compartment, wherein the second coolant storage compartment is in fluid communication with the first coolant storage compartment, wherein the first coolant storage compartment includes the first heater element and the second heater element, and wherein the second coolant storage compartment is unheated.

12. The coolant storage tank according to claim 11, in which the second coolant storage compartment is separated from the first coolant storage compartment by a partition wall, the wall including an aperture therein for providing the fluid communication between the compartments.

13. The coolant storage tank according to claim 11, in which the first heater element forms at least part of the base of the first coolant storage compartment.

14. A fuel cell system including the coolant storage tank of claim 11.

15. A method of melting frozen coolant in a coolant storage tank of a fuel cell system, the coolant storage tank including at least one heater element for melting frozen coolant within said tank, said coolant storage tank configured to supply coolant to a fuel cell of the fuel cell system for at least cooling the fuel cell during operation, said heater element configured to be powered by the fuel cell during operation, the method comprising the steps of;

operating said fuel cell without coolant from the coolant storage tank;

operating in a first melt mode comprising activating the at least one heater element to melt at least part of the frozen coolant within the coolant storage tank;

supplying the melted coolant to the fuel cell; and operating in a second melt mode different to the first melt mode;

wherein the coolant storage tank comprises a first heater element and a second heater element and wherein the first melt mode comprises activating the first heater element and the second melt mode comprises activating the second heater element;

wherein the energy output per unit volume occupied by the first heater element is higher than the energy output per unit volume occupied by the second heater element.

16. A method according to claim 15, in which in the second melt mode at least one of:

the second heater element is activated and the first heater element is deactivated; and more power is supplied to the second heater element from the fuel cell in the second melt mode than the power supplied to the first heater element from the fuel cell in the first melt mode.

17. The method of claim 15, in which the first melt mode is operated for a first period of time and the second melt mode is operated subsequently for a second period of time.

* * * * *